(12) United States Patent
Cardente

(10) Patent No.: US 7,359,927 B1
(45) Date of Patent: Apr. 15, 2008

(54) METHOD FOR PERFORMING PERIODIC REPLICATION OF DATA ON A REMOTE STORAGE SYSTEM

(75) Inventor: John Cardente, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 519 days.

(21) Appl. No.: 11/001,229

(22) Filed: Dec. 1, 2004

(51) Int. Cl.
*G06F 17/30* (2006.01)

(52) U.S. Cl. .................. 707/204; 707/10; 707/202

(58) Field of Classification Search ........ 707/200, 707/201, 202, 203, 204, 10; 711/157, 161, 711/162
See application file for complete search history.

(56) References Cited

U.S. PATENT DOCUMENTS 6,785,786 B1 * 8/2004 Gold et al. ............... 711/162
7,117,327 B2 * 10/2006 Hirakawa et al. ........... 711/162

* cited by examiner

*Primary Examiner*—John Cottingham
*Assistant Examiner*—Jason L Alvesteffer

(57) ABSTRACT

A method for transferring a copy of data stored at a source to a remote location. The method includes storing at the source sequence of sets of changes in the data stored at the source. The method transfers to a first one of a pair of storage volumes at the remote location the most recent pair of the stored sets of changes in the sequence of data stored at the source at a time prior to such transfer. The method subsequently transferring to a second one of the pair of storage volumes at the remote location the most recent pair of the stored sets of changes in the in the sequence of data stored at the source at a time prior to such subsequent transfer.

2 Claims, 4 Drawing Sheets

METHOD FOR PERFORMING PERIODIC REPLICATION OF DATA ON A REMOTE STORAGE SYSTEM

TECHNICAL FIELD

This invention relates generally to data storage systems and more particularly to methods used by such systems to periodically perform periodic replication (i.e. copying) of data in such system on a remote storage system. Still more particularly, the invention relates to methods for performing periodic replication of such data that is able to maintain a point-in-time consistent remote copy of such data in the presence of errors which may be generated in the copying of such data without any intelligence in the remote storage system.

BACKGROUND

As is known in the art, many data storage systems periodically store a copy, or replica, of the data currently in such system at a remote storage system. Former replication approaches require remote storage systems to have some "intelligence" in order to prevent transmission errors corrupting the data copy at the remote storage system.

More particularly, many applications maintain persistent state information by storing data on disk. Often the data stored on disk is designed to allow an application to return to the same state after an unexpected restart. The ability of an application to reliably return to a previous state often depends on data being stored to disk in a specific order. In order to protect against data loss and business interruption due to disasters, application data is often replicated to a remote site. In many cases this replicated data is intended to allow an affected application to be restarted at the remote site and return to its pre-failure state. As a result, data must be copied to the remote site in the appropriate order. At present, there are three general methods to reliably maintain a remote copy suitable for application restart: synchronous, semi-synchronous and periodic replication. Conventionally, all three methods require the remote storage systems to have some degree of intelligence in order to ensure that the remote copy remains point-in-time consist with the source data when errors occur. This requirement can prohibit performing consistent replication between dissimilar storage systems either from different vendors or different models from the same vendor. At present, this requirement prohibits performing replication between dissimilar systems: either storage systems from different vendors or, in some cases, different storage system models from the same vendor.

Still more particularly, many applications maintain persistent state information by storing data on disk. Often the data stored on disk is designed to allow an application to return to the same state after a planned or unexpected restart. To ensure that they can return to the same state applications strictly control the order in which state information is written to disk. Typically, I/O requests (e.g., a request from a host computer to store data in a disk (i.e., a write I/O request), or a request from the host computer to obtain data from the disk (i.e., a read I/O request)) are not issued until I/O operations to store previous state information have completed. Such write requests are said to be dependent on the previous write requests. Applications rely on this explicit control of dependent write ordering to ensure that there will be no "holes" in the state information stored on disk.

In order to guarantee that this will be the case, disk storage systems must store write data in the order that it is received. In cases where write data is first stored in a cache memory prior to its being stored in the disk, the data storage system must make certain that the data for all successfully completed write I/Os is always written to disk.

Saving state information to disk protects against data loss from an application or server failure. It does not, however, prevent data loss in the event of a disaster that affects the entire data center. Examples of such disasters include fires, earthquakes, and other similar catastrophic events.

As is also known in the art, Disaster Recovery (DR) solutions are commonly used to prevent these kinds of events from destroying data for critical applications. Often, an important component of such solutions is to maintain a copy of critical application data, including state information, at a geographically remote location. Ideally the remote location is far enough away from the primary data center to ensure that a single disaster (within reason) will not be able to destroy both data centers. In the event of a disaster, the remote copy of data can be used to either reconstruct a new primary datacenter or restart the affected applications at the remote location itself. In either case the remote copy ensures that business will be able to continue despite the disaster.

The term remote "replication" is often used to refer to the act of maintaining a remote copy of disk data. Some advanced storage systems are capable of performing remote replication automatically in a manner transparent to applications. Such solutions relieve critical applications from the burden of managing the remote data copy and allow them to focus on performing their particular business function. More particularly, a remote copy of critical application data is subject to the same requirements as the original data. Specifically, dependent writes must be applied to it in the same order that they were to the original copy of data by the application. Otherwise, it may not be possible to use the remote copy to restart an application and restore it to its pre-failure state. Clearly there are two states that a remote copy can be in:

Consistent: the remote copy is identical to the source data and therefore can be used to restore an application to its current state.

Inconsistent: the remote copy does not match any previous state of the source data and therefore cannot be used to return an application to a valid state.

There is, however, a third intermediate state:

Point-in-time Consistent: the remote copy is identical to the source data at some point in the past and can be used to return an application to a previously valid state.

Essentially, a point-in-time consistent copy is an older version of the source data that has had an application's dependent writes up to some previous time applied to it in the correct order. A point-in-time consistent copy, therefore, can be used to return an application to the previously valid state it was in at the time represented by the point-in-time copy. It should be noted, however, that recovering from a point-in-time consistent copy does not return the application to the same state that it was in at the time of failure. The implication of this is that some data may be lost. While data loss is in general undesirable there are, however, applications that can tolerate it making a point-in-time replication scheme an acceptable solution.

At present there are three general methods for maintaining remote copies of data suitable for application restart.

Synchronous remote replication: Here, each data modification (i.e. host write request) is simultaneously applied to both the local and remote copies. Modifications are strictly ordered and completed serially. As a result the local and remote copies of data are effectively always identical;

Semi-synchronous remote replication; Here, each data modification (i.e. host write request) is applied to the local copy of data and queued for later application to the remote copy. Modifications to the remote copy are strictly ordered and completed serially. As a result the remote copy is always a point-in-time consistent version of the source data. Some semi-synchronous replication schemes define a maximum queue depth which, when reached, causes replication to fall back to a completely synchronous behavior in order to limit the skew between the source and remote copies; and Periodic remote replication; Here, consecutive data modifications (i.e. host write requests) are aggregated into a series of "change sets" based on some periodic interval such as elapsed time or the amount of data modified. Each change set is then atomically applied to the remote copy in the appropriate order. As a result the remote copy is always a point-in-time consistent version of the source data.

These principal differences between these three methods are levels of consistency and performance. Synchronous replication can maintain consistent remote copies but the latency of keeping the remote copy up to date can have significant negative impacts on application performance. Semi-synchronous replication decouples the updating of the source and remote copies to yield better performance but as a result can only achieve point-in-time consistency. Finally periodic replication can achieve even greater levels of performance since it is able to apply all the modifications in a change set in parallel and merge multiple modifications to the same piece of data during a period into a single change to the remote copy. However, this batching of modifications prevents periodic replication from being able to achieve the same levels of consistency as either synchronous or semi-synchronous replication. In addition the unordered, parallel application of modifications in a change set renders the remote copy inconsistent while it is being updated. In general, choosing the appropriate method is highly situational and depends on a variety of factors including the tolerable amount of data loss.

Generally speaking, some replication schemes are special cases of others. For instance synchronous replication can be considered a special case of semi-synchronous replication with a maximum queue depth of 1. Likewise semi-synchronous replication can be considered a special case of periodic replication with a change set size of 1. These observations suggest the possibility of applying enhancements to one replication method to its special case derivative(s) as well.

While in transit to the remote location it is possible for data modifications to suffer errors. Unless prevented, these corrupted operations can ruin the integrity of the remote data copy rendering it inconsistent with the source data, and therefore unsuitable for disaster recovery. In order to ensure the integrity of the remote data copy, remote replication schemes often rely on the remote storage system having some amount of "intelligence" to prevent corrupted data modifications from being applied to the remote copy.

The serial nature of synchronous and semi-synchronous replication schemes results in only a single data modification to the remote copy being performed at a time. Therefore, for these schemes, maintaining the integrity of the remote copy is simply a matter of preventing a single corrupted modification from being applied. This implies that only a limited amount of intelligence is needed at the remote site to maintain integrity for these replication schemes.

To achieve greater levels of performance, periodic remote replication schemes often apply multiple modifications in a change set to the remote copy simultaneously. In addition, the modifications in a change set are often applied in no particular order. This behavior makes maintaining the integrity of the remote copy more problematic as recovering from an error not only involves preventing corrupted data from being applied to the remote copy but it also requires reversing all previous modifications from the change set that completed successfully. As result, conventional periodic replication schemes require the remote storage system to have significantly more intelligence to track the progress of and changes by change sets in order to successfully recover from errors.

Further, there is a need for remote storage systems to have some degree of intelligence often limits the interoperability of storage systems. At present, the lack of open standards prevents remote replication between storage systems from different vendors. Sometimes, similar issues prevent replication between different models of storage systems from the same vendor. As a result, remote replication schemes are often limited to specific configurations based on homogeneous storage systems.

SUMMARY

In accordance with a method is provided for transferring a copy of data stored at a source to a remote location. The method includes storing at the source a sequence of sets of changes in the data stored at the source. The method transfers to a first one of a pair of storage volumes at the remote location the most recent pair of the stored sets of changes in the sequence of data stored at the source at a time prior to such transfer. The method subsequently transferring to a second one of the pair of storage volumes at the remote location the most recent pair of the stored sets of changes in the in the sequence of data stored at the source at a time prior to such subsequent transfer.

In one embodiment, the method successively repeats the transferring and subsequently transferring.

In one embodiment, the repeating is performed periodically.

In one embodiment, the repeating is performed as a function of the amount of data in the each one of the sets thereof.

In one embodiment, a method is provided for transferring a copy of data stored at a source to a remote location. The method includes storing at the source a first one of a sequence of sets of changes in the data stored at the source. The method includes designating in the source a first one of a pair of storage volumes at the remote location as a target for storage therein of the first one of the stored sets of data changes. The method includes transferring to the targeted first one of a pair of storage volumes the first one of the stored sets of data changes while leaving in storage at the source the first one of the sets of data changes. The method includes designating in the source a second one of a pair of storage volumes at the remote location as a target for storage therein of the first one and next subsequent one of the sets of changes in data in the sequence thereof. The method includes transferring to the targeted second one of a pair of storage volumes the first one of the stored sets of data changes and the next subsequent one of the sets of changes in data in the sequence thereof while leaving in storage at the source said the next subsequent one of the sets of changes in data in the sequence.

Thus, with such method, consistent periodic remote replication is achieved without needing an intelligent remote storage system. As a result this method can be used to perform periodic remote replication between heterogeneous storage systems. The method is particularly suitable for those instances where sufficient resources exist and consistent heterogeneous remote replication is a priority. Semi-synchronous replication schemes are a special case of periodic replication schemes (i.e. change set size is 1). Therefore, the method may be used to provide heterogeneous replication solutions for semi-synchronous schemes as well.

Further, with such method, periodic replication is performed that is able to maintain a point-in-time consistent remote copy of data in the presence of errors without any intelligence in the remote storage system. When suitable, this method can be used to perform consistent periodic replication between dissimilar storage systems. As noted, the method can also be applied to semi-synchronous replication schemes as well. This ensures that the remote site can be used for application restart and failover in the event of a disaster, The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
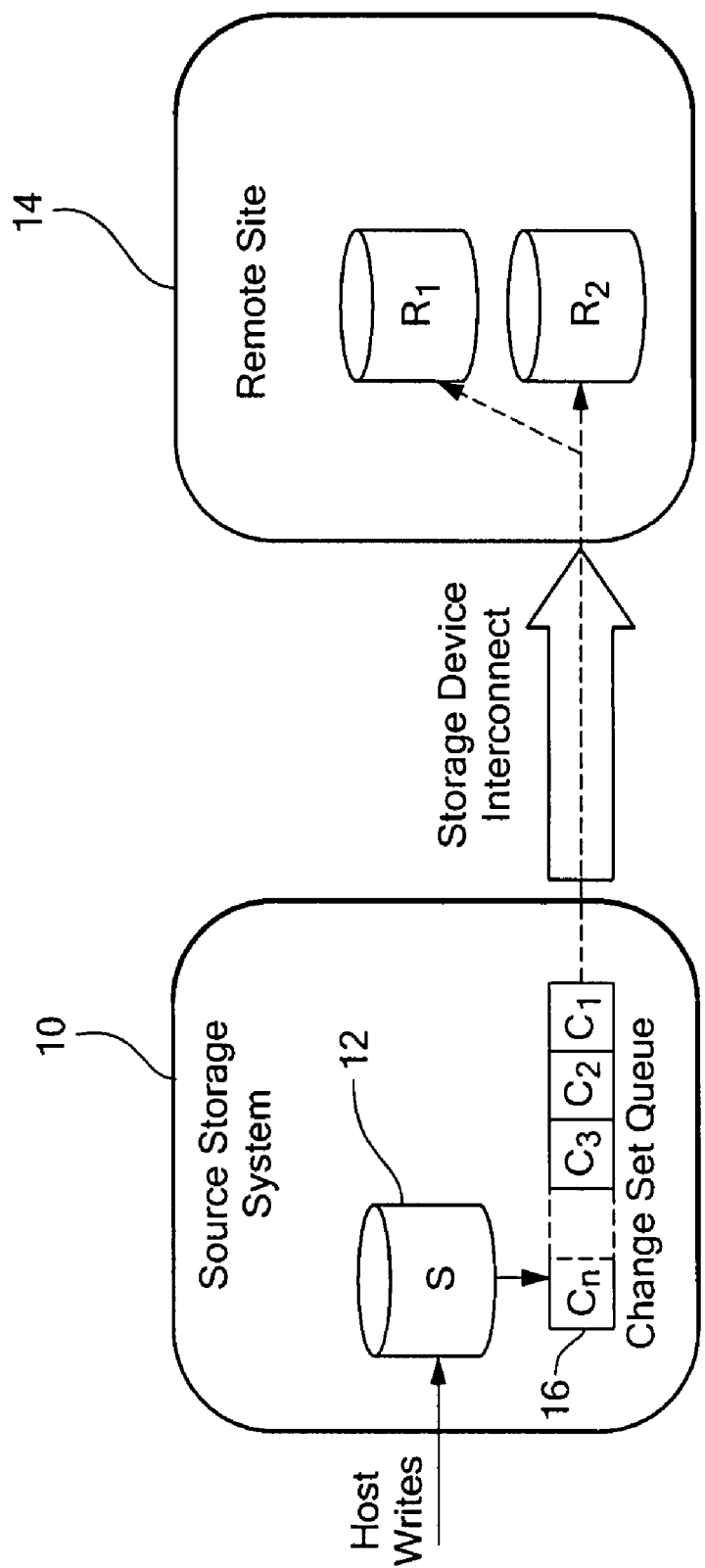
FIG. 1 is a block diagram of a data storage system coupled to a remote location adapted for transferring a copy of data stored at the data storage system to the remove location according to the invention.

Referring now to FIG. 1, a data storage system 10 is shown having a storage volume, such as disk 12. The storage system 10 is configured, in any conventional manner, to enable read and write I/Os from a host computer, not shown. Here, we will describe write I/Os. The data storage system disk 12 is shown as a cylinder having data S and represents the source data S stored by the storage system 10 at a source location. The cylinders marked $S_1$-$S_n$ represent the different point-in-time consistent versions of the source volume of data stored sequentially in the disk 12; i.e., S, with their subscripts defining their relative order. The labels $C_n$ represent the series of change sets associated with source data S that define the differences between the different point-in-time versions of S. The change sets of data are maintained by the source storage system 10 and their subscripts define the relative order such sets of data will be transferred to a remote site 14 for replications in storage volumes R1 and R2 at such remote site 14. Thus, the order of the data from the source 12 to be transferred, i.e., replicated, must be preserved at the remote site 14 is here, $S_1$, then $S_2$, then $S_3$, . . . then $S_n$, etc.

The cylinders marked $R_1$ and $R_2$ represent the two remote copies of the source data maintained at the remote site 14. Effectively, the two remote copies are completely independent and theoretically could be stored on different remote storage volumes; i.e., $R_1$ and $R_2$.

Figure 1A:
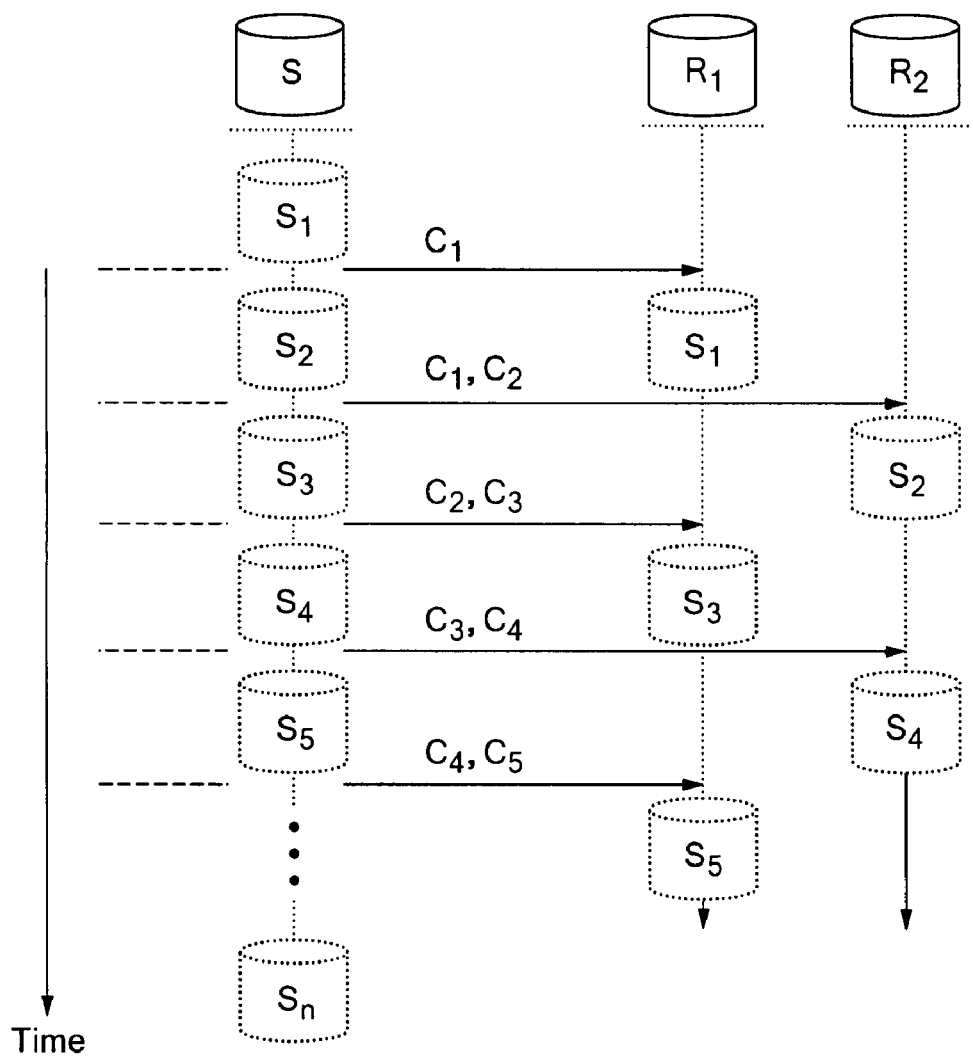
FIG. 1A is a diagram showing operation of the system of FIG. 1.

Referring now to FIG. 1A, the sequence diagram of the transfer of the change sets of data $C_1$-$C_n$ is shown, with time running from top to bottom. The diagram illustrates how the method applies the change sets $C_1$-$C_n$ to the two remote copies of data. Essentially, the method interleaves the application of change sets $C_1$-$C_n$ between the two remote copies of data, i.e., the disks $R_1$ and $R_2$ alternate in storing the change sets $C_1$-$C_n$. These data change sets $C_1$-$C_n$ are stored sequentially in a register 16 in at site 10.

Assume that initially, the data S in the storage volume 12, and the data in storage volumes $R_1$ and $R_2$ are all reset. Next, assume the data S in volume 12 changes by change set $C_1$ at a time prior to time $t_1$. Therefore, the data in volume 12 has changed from S to $S_1$ because of the change set $C_1$. i.e., data $S_1$ is original data S modified by the data in change set. It is noted this algorithm assumes that C1 contains all the changes made to S since its creation. This is necessary in order to initialize R1 and R2.

At time $t_1$, change set $C_1$ is transferred from queue or register 16 to the remote site 14 for storage in storage volume $R_1$ and thus volume $R_1$ stores a copy of the data $S_1$ then in storage volume 12, i.e., here labeled $S_1$, i.e., the original data S updated by change set $C_1$.

At a time prior to subsequent time $t_2$, assume the data, now $S_1$, in volume 12 is changed by change set $C_2$ i.e., the data in volume 12 is now data $S_2$. At time $t_2$ both the change sets $C_1$ and $C_2$ are transferred from the register 16 at the site 10 to the remote site 14 for storage in storage volume $R_2$ and thus volume $R_2$ stores a copy of the data $S_2$ then in volume 12, i.e., the original data S updated by both change $C_1$ followed by the update by change set $C_2$.

At a time prior to subsequent time $t_3$, assume the data, now $S_2$, in volume 12 is changed by change set $C_3$ i.e., the data in volume 12 is now data $S_3$. At time $t_3$ both the change sets $C_2$ and $C_3$ are transferred from the register 16 at the site 10 to the remote site 14 for storage in storage volume $R_1$ and thus volume $R_1$ stores a copy of the data $S_3$ then in volume 12, i.e., the data $S_1$ updated by both change $C_2$ followed by the update by change set $C_3$.

At a time prior to subsequent time $t_4$, assume the data, now $S_3$, in volume 12 is changed by change set $C_4$ i.e., the data in volume 12 is now data $S_4$. At time $t_4$ both the change sets $C_3$ and $C_4$ are transferred from the register 16 at the site 10 to the remote site 14 for storage in storage volume $R_2$ and thus volume $R_2$ stores a copy of the data $S_4$ then in volume 12, i.e., the data $S_2$ updated by both change $C_3$ followed by the update by change set $C_4$.

The process repeats as indicated in FIG. 1A.

It is noted that if there is an error in the transmission of data change sets $C_1$ and $C_2$ at time $t_2$, such error is detected at remote system 14 using the native capabilities of standard transmission protocols, and reported to storage system 10. The storage system 10 then knows that the volume $R_1$ has the most recent copy $S_1$. Likewise, if there is an error in the transmission of data change sets $C_2$ and $C_3$ at time $t_3$, such error is detected at remote system 14 and reported to storage system 10. The storage system 10 then knows that the volume R2 has the most recent copy $S_2$.

It is noted that the times $t_1, t_2, t_3, \ldots t_n$ are here periodic. Thus, in summary, as the source data is modified (i.e. host write requests) consecutive modifications are aggregated into change sets based on some periodic event (i.e. time or amount of data modified). As data change sets are queued in order pending their application to the remote site.

Thus, it is noted from the discussion above that the change sets $C_1$-$C_n$ are applied in pairs to each disk $R_1, R_2$ to produce more recent point-in-time consistent copies of the source data. Because the method only modifies one remote copy of data at a time, the other remote copy always represents a valid point-in-time copy of the source. Thus, should an error occur while applying a change set to one of the remote copies, rendering it inconsistent, all replication is stopped. This ensures that the other remote copy will remain valid and can be used for disaster recovery. To recover from such errors, the source storage system 10 could copy a point-in-time consistent version of the source data, in entirety, to the corrupted remote copy. Once completed, it may be possible to resume the above replication method to continue to provide a means for disaster recovery.

In the event of a disaster, some mechanism is needed at the remote site to know which remote copy contains the most recent, and valid point-in-time consistent copy of the source data. This can be achieved by having the source storage system 10 store the necessary meta-data at the remote site in a separate location (i.e. a third storage volume). As a result, no intelligence is needed on the remote storage system to maintain a valid point-in-time consistent copy of the source data. Some intelligence is needed to determine the appropriate copy to use in the event of the disaster but such intelligence need not be located in the remote storage system. For instance this intelligence could be embedded in programs that get executed as part of a disaster recovery process.

Figure 2:
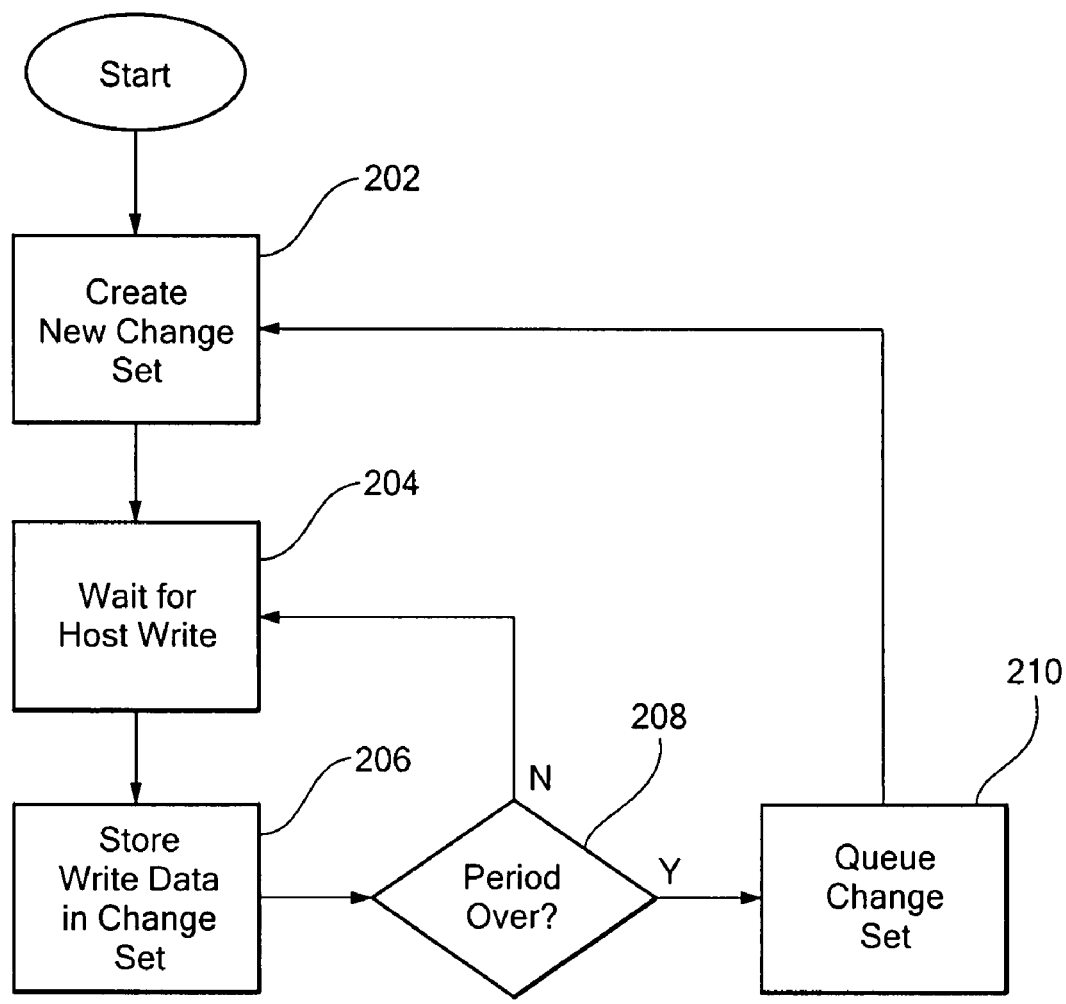
FIG. 2 is a flow diagram showing the steps used by the data storage system of FIG. 1 to create the data change sets for storage therein for transfer to the remote location in accordance with the invention.
Figure 3:
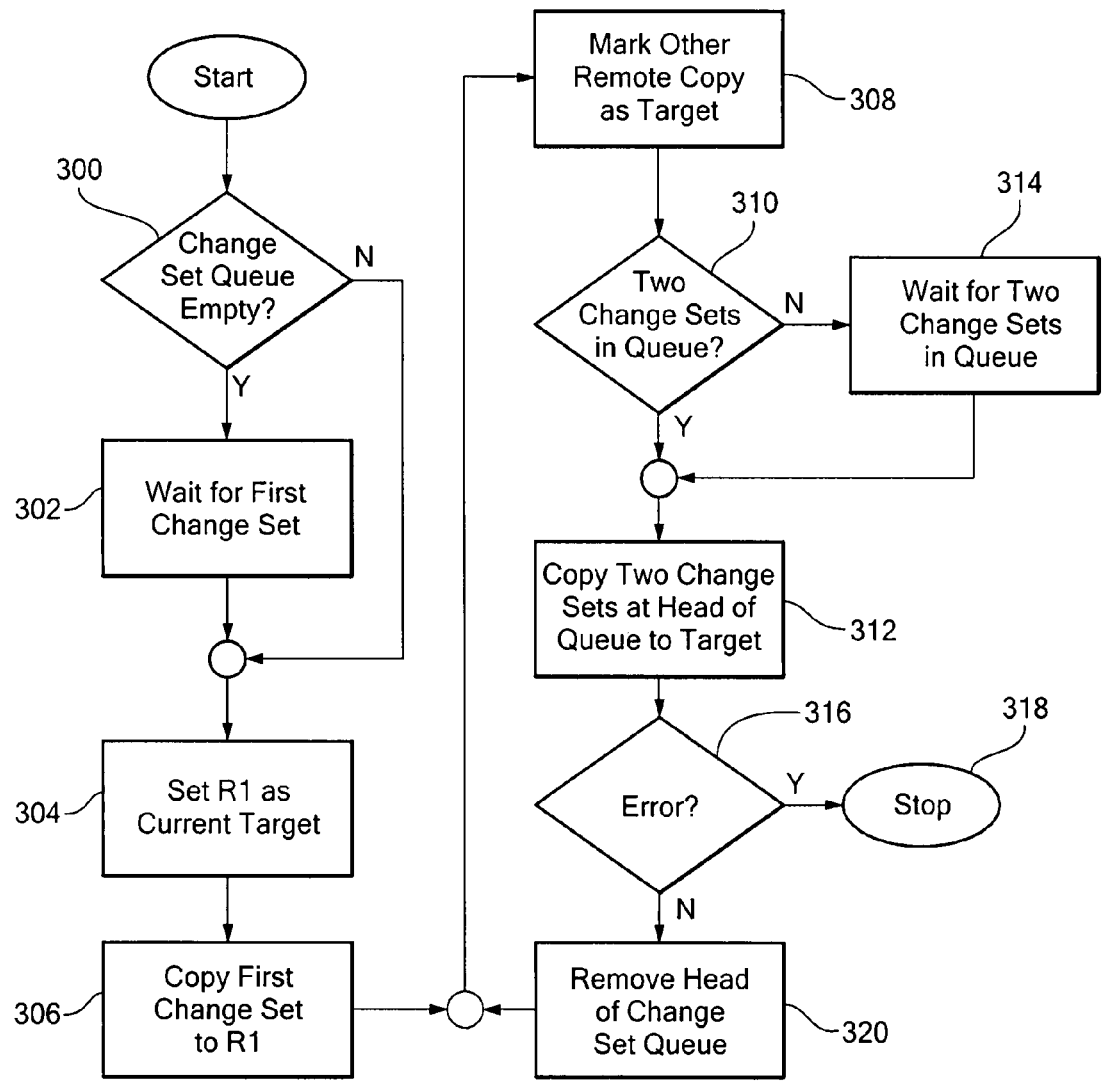
FIG. 3 is a flow diagram of the steps used by the system of FIG. 1 to copy the data change sets produced in accordance with the flow diagram of FIG. 2 and transferring such sets to the remote location in accordance with the invention.

Referring now to FIGS. 2 and 3, as noted above, the source data stored in volume 12 (FIG. 1) is modified (i.e. host write requests) consecutive modifications are aggregated into change sets $C_1$-$C_n$ based on some periodic event (i.e. time, as described above, or amount of data modified). The change sets $C_1$-$C_n$ are queued in register 16 in order pending their application to the remote site 14.

Thus, FIG. 2 is a flow diagram showing the steps of the method used to create the data change sets $C_1$-$C_n$ for storage in the register 16. To begin, the source storage system 10 initializes its local state information to indicate that $R_1$ is the current "target" remote copy (i.e. the remote copy being modified), Step 202 (FIG. 2). The first change set, here $C_1$ at the head of the change set queue in register 16 at this time is applied to remote volume $R_1$ (note that the change set is not removed from the queue register 16). The system 10 then waits for a write I/O from the host computer, Step 204. The change set $C_n$ from the write I/O is stored in the register 16, Step 206. If the predetermined time period, or data volume, is over, or met, as the case may be, the queue. i.e., register 16 stores the next data change set $C_2$, Step 210; otherwise the system 10 waits for a host computer write I/O.

Referring now to FIG. 3, a flow diagram of the process used to copy data changes $C_1$-$C_n$ to remote volumes $R_1$, $R_2$, as shown.

In Step 300, the system 10 checks to determine whether the queue, i.e., register 16, is empty. If it is empty, the system 10 waits for the first data change set, Step 302. If the register 16 is not empty or if there has been storage of a data change set on register 16, the remote volume $R_1$ is set as the current target for the data copy, Step 304.

Next, the first data change set, $C_1$, is transferred to volume $R_1$, Step 306.

Next, R2 is marked as the target for the next copy of the data changes, e.g., $C_1$ and $C_2$, Step 308.

Next, the system 10 determines whether there have been two data change sets in register 16, Step 310. If not, the system 10 waits until there are two data change sets in register 16, Step 314. When there are two data change sets, e.g., $C_2$ and $C_3$, in register 16, the two data change sets at the head (i.e. the oldest pair of data change sets) of the queue, i.e., register 16, are transferred to the targeted deice, here volume $R_2$, Step 312.

Next, the deice 10 determines from the remote site 14 whether there has been an error in the data transfer, Step 316, If there has been an error it is noted by the system 10 and the transfer process is terminated, Step 318; otherwise, if there has not been an error, the head (i.e., oldest) data change, here $C_1$, is removed from the register 16. Step 320 and the process returns to Step 308.

Thus, in summary, to begin, the source storage system 10 initializes its local state information to indicate that R1 is the current "target" remote copy (i.e. the remote copy being modified). Next, the first change set at the head (i.e., oldest) of the change set queue is applied to remote copy R1 (note that the change set is not removed from the queue). Next, the source storage system 10 queries its local state information to determine the current target remote copy and sets the other remote copy as the new "target" remote copy. Next, the source storage system 10 applies the two change sets at the head (i.e. the oldest pair of data change sets) of the change set queue to the current target remote copy. The source storage system 10 removes the set at the head (i.e., oldest) of the change set queue. Then the process repeats by having the source storage system 10 query its local state information to determine the current target remote copy and sets the other remote copy as the new "target" remote copy; the source storage system 10 applies the two change sets at the head (i.e. the oldest pair of data change sets) of the change set queue to the current target remote copy; and the source storage system 10 removes the set at the head (i.e., oldest) of the change set queue etc.

As indicated earlier, an error causes the method to suspend operation to maintain the integrity of the non-target remote copy. An error recovery procedure may be used to return the corrupted remote copy to a known state and resume the above method.

It should be noted that many applications maintain persistent state information by storing data on disk. Often the data stored on disk is designed to allow an application to return to the same state after an unexpected restart. The ability of an application to reliably return to a previous state often depends on data being stored to disk in a specific order. In order to protect against data loss and business interruption due to disasters, application data is often replicated to a remote site. In many cases this replicated data is intended to allow an affected application to be restarted at the remote site and return to its pre-failure state. As a result, data must be copied to the remote site in the appropriate order. At present, there are three general methods to reliably maintain a remote copy suitable for application restart: synchronous, semi-synchronous and periodic replication. Conventionally, all three methods require the remote storage system 14 to have some degree of intelligence in order to ensure that the remote copy remains point-in-time consist with the source data when errors occur. This requirement can prohibit performing consistent replication between dissimilar storage systems either from different vendors or different models from the same vendor. The method according to the invention performs periodic replication that is able to maintain a point-in-time consistent remote copy of data in the presence of errors without any intelligence in the remote storage system 14. As a result, when suitable, the method can be used to perform consistent replication between dissimilar storage systems. The method can be used with to semi-synchronous replication schemes as well.

The method described above requires the storage system at the source site to have the following abilities:

The ability to aggregate consecutive modifications to the source data into a series of change sets. This may involve some form of "copy-on-write" mechanism to preserve the various versions of a single piece of data that may exist in the different change sets.

The ability to transmit the modifications in a change set to a remote copy.

The ability to record which remote copy of data is currently being modified (hereafter referred to as the target remote copy)

The method the storage system at the remote site to have the following abilities:

The ability to receive data modifications from the source site and apply them to a copy of data.

Sufficient capacity to maintain two full copies of the source data.

A storage location accessible to the source storage system to store meta-data indicating which of the two copies of data contains the latest valid point-in-time version of the source data.

It is noted that at a high level, the method maintains a consistent copy of the source data at the remote site by manipulating how change sets are applied to the two remote copies.

A number of embodiments of the invention have been described. Nevertheless, it will be understood that various modifications may be made without departing from the spirit and scope of the invention. For example, the method can be extended to use more than two remote copies to maintain more than one point-in-time consistent copy of data. This can be done by copying change sets more than two at a time (i.e., to maintain two consistent copies, three remote copies could be used and updated by sending three change sets at a time). Further, it should be understood that the volumes R1 and R2 need not be at the same physical location but may be at two different physical locations and in such case the two physical locations would be collectively referred to as a "remote location". Accordingly, other embodiments are within the scope of the following claims.

What is claimed is:

1. A method for transferring a copy of data stored at a source to a remote location, comprising:
    (a) storing at the source a first one of a sequence of sets of changes in the data stored at the source;
    (b) designating in the source a first one of a pair of storage volumes at the remote location as a target for storage therein of the first one of the stored sets of data changes;
    (c) transferring to the targeted first one of a pair of storage volumes the first one of the stored sets of data changes while leaving in storage at the source the first one of the sets of data changes;
    (d) designating in the source a second one of a pair of storage volumes at the remote location as a target for storage therein of the first one and a second subsequent one of the sets of changes in data in the sequence thereof,
    (e) transferring to the targeted second one of a pair of storage volumes the first one of the stored sets of data changes and the second subsequent one of the sets of changes in data in the sequence thereof while leaving in storage at the source said the first one of the sets of data changes and the second subsequent one of the sets of changes in data in the sequence thereof;
    (f) determining from the remote location whether there has been an error in the transferring to the targeted second one of a pair of storage volumes the first one of the stored sets of data changes and the second subsequent one of the sets of changes in data in the sequence thereof while leaving in storage at the source said the first one of the sets of data changes and a second subsequent one of the sets of changes in data in the sequence thereof;
    (g) in the absence of an error being determined, removing the first one of the stored sets of data changes and designating in the source the first one of a pair of storage volumes at the remote location as a target for storage therein of the second one and a third subsequent one of the sets of changes in data in the sequence thereof;
    (h) transferring to the targeted first one of a pair of storage volumes the second subsequent one of the stored sets of data changes and the third subsequent one of the sets of changes in data in the sequence thereof while leaving in storage at the source said the second and third subsequent one of the sets of changes in data in the sequence thereof; and
    (i) in the absence of an error being determined, removing the second one of the stored sets of data changes and designating in the source the second one of a pair of storage volumes at the remote location as a target for storage therein of the third one and a fourth subsequent one of the sets of changes in data in the sequence thereof.

2. The method recited in claim 1 wherein steps (e) through (i) are iteratively repeated for subsequent sets of data changes.

* * * * *